June 25, 1935.  B. DICK ET AL  2,005,855
BRAKING APPARATUS
Filed Feb. 26, 1932  2 Sheets-Sheet 1
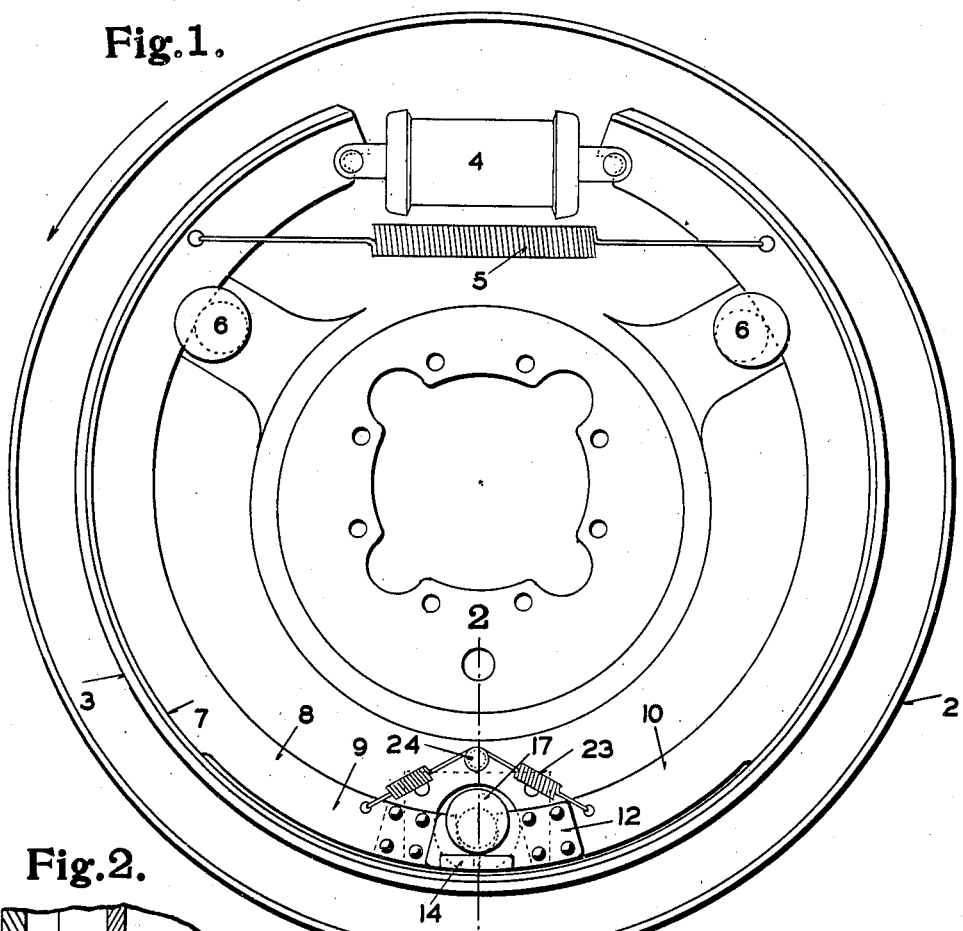
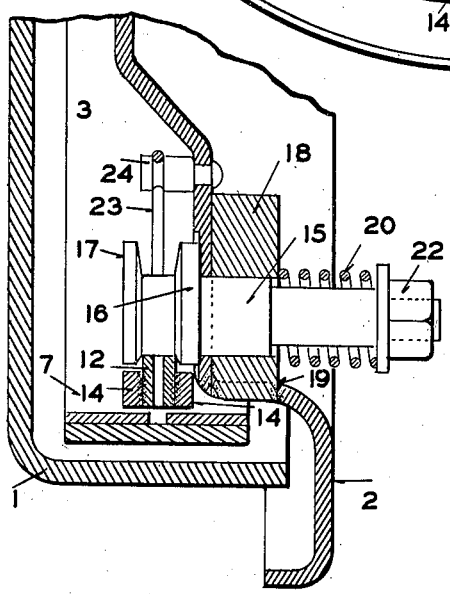
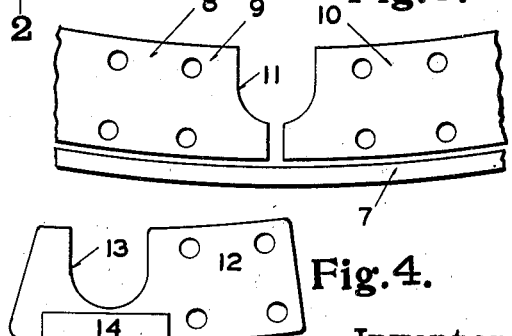
Inventors
BURNS DICK
STEVE SCHNELL
By
Att'y.

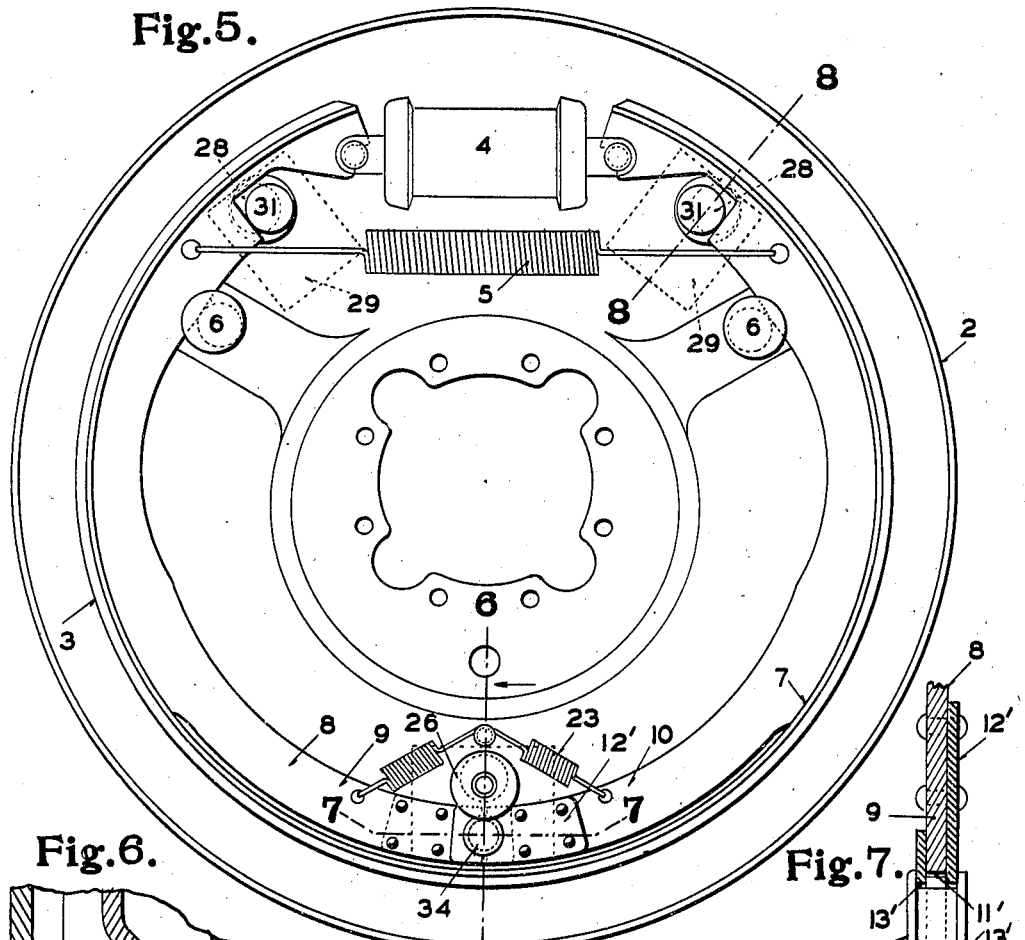
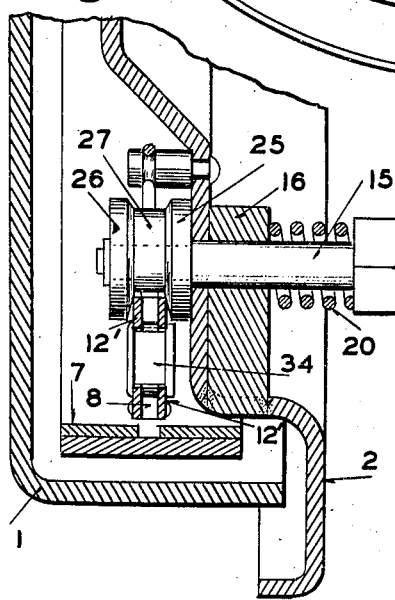
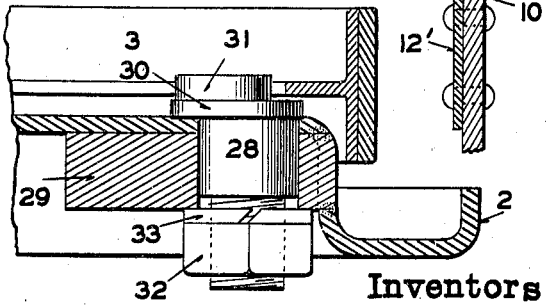

Patented June 25, 1935

2,005,855

UNITED STATES PATENT OFFICE

2,005,855

BRAKING APPARATUS

Burns Dick, Ferguson, and Steve Schnell, St. Louis, Mo., assignors to Wagner Electric Corporation, St. Louis, Mo., a corporation of Delaware Application February 26, 1932, Serial No. 595,244

16 Claims. (Cl. 188—78)

Our invention relates to braking apparatus and has for its principal object the production of a brake of the reinforced "band" type which will have certain desirable characteristics of the two-shoe type of brake, including that of requiring only a small and predetermined pedal pressure to bring it into engagement with the brake drum.

Other objects will become apparent from the following description of two embodiments of our invention taken in connection with the accompanying drawings in which Figure 1 is a side elevation of a brake assembly (the brake drum being omitted), disclosing one form of our improved brake band; Figure 2 is a cross section on the line 2—2 of Figure 1; Figure 3 is a view of the central portion of the brake band before assembly; Figure 4 is a view of one of the web plates; Figure 5 is a side elevation of a modified form of brake employing our improved brake band; Figure 6 is a cross-sectional view on the line 6—6 of Figure 5; Figure 7 is a cross sectional view on the line 7—7 of Figure 5; and Figure 8 is a cross sectional view on the line 8—8 of Figure 5, disclosing one of the adjustable anchor pins.

The numeral 1 indicates the drum of the brake which is secured in the usual manner to the wheel of the vehicle and is enclosed on one side by the backing plate or support 2 secured to some fixed part of the vehicle. The brake shoe 3 is of the band type and is mounted within the drum and is adapted to have its free ends expanded into engagement with the drum by suitable means such as the hydraulic mechanism 4. The band is biased to "off" position by the usual spring 5, its "off" position clearance at each end being determined by the adjustable stops 6.

The brake band 3 is of the T section type and comprises a lining receiving flange 7 and a reinforcing web 8. The web is separated from the flange at the central part of the band and over an arc extending approximately forty-five degrees on each side of the center of the band. The web 8 is also severed at its center, dividing it into two parts 9 and 10, thereby reducing the amount of force necessary to bend the band to engage it with the drum, the place of severance being convenient for the use of a combined anchor and adjustable clearance stop. As clearly shown in Figure 3, this is accomplished by cutting a semi-circular recess 11 in the inner edge of the web and then severing the remainder of the web at this point. A plate 12, provided with a semi-circular recess 13, is riveted to each web part to form a reinforcing structure therefor at the point of anchorage, one of the plates 12 being on one side of the web part 9 and the other on the other side of the part 10, the plates being so located that the recesses 11 and 13 coincide. Each of the plates 12 has a metal strip 14 welded to its outer side just below the recess 13 to form a surface for cooperation with the adjustable clearance stop.

The combined anchor and adjustable clearance stop comprises a bolt 15 extending through and having bearing in the backing plate and the end of the bolt within the drum is provided with a pair of spaced apart cam members 16 and 17 eccentric to the axis of the bolt. The portion of the bolt between the cam members is adapted to fit within the recesses 11 and 13 of the web and the plates to form the anchor for the brake band. The eccentric cam members lie in the same plane as the strips 14 and cooperate therewith, besides acting as a guide for the band. The bearing of the bolt in the backing plate is reinforced by means of a block 18 fitted within a cut-out portion 19 in a flange of the backing plate and secured to the backing plate by welding. A compression spring 20, between the block 18 and the head 22 of the bolt, completes the combined anchor and adjustable clearance stop structure. A spring 23, connected at each end to the web 8 and held in tension by being passed over a pin 24 in the backing plate, holds the band in disengaged position with the strips 14 in engagement with the eccentric cams 16 and 17.

When the hydraulic mechanism 4 is actuated, the free ends of the brake band are moved outwardly into engagement with the drum whose rotation may be assumed as being in the direction of the arrow (Figure 1). The force to accomplish this is reduced, due to the fact that the web of the band has been severed at the anchor and the only force required is that necessary to bend the central part of flange 7 and overcome the spring 5. If the web of the band were not separated from the flange, as shown, the band, when expanded, would be applied to the drum with a greater pressure over the central part of the band than at other points of contact. The separation of the web from the flange over the central portion of the band increases the flexibility of the band at this point and, therefore, decreases the amount of pressure.

By the use of the combined anchor and adjustable clearance stop, we are able to secure two results with one mechanism. The concentric part of the bolt at all times directly takes the torque of the brake band and the eccentric cams 16 and 17 act as clearance stops for the band in "off" position, and also as a guide for the band. The spring 20 need only be strong enough to keep the bolt 15 from rotating after it has been set in adjusted position.

In Figure 5 we have disclosed our novel brake band in a brake in which each end of the band is provided with an anchor instead of the center being provided with a single anchor, as shown in the embodiment just described. The drum 1, backing plate 2, actuating mechanism 4, return spring 5, and adjustable stops 6 are the same as in Figure 1. The band 3 is of slightly different construction at its central part since it is not necessary to provide an anchor at this point. The web 8 is severed to form the two halves 9 and 10 and an opening 11' in a manner similar to that shown in Figure 1. The plates 12' are provided with holes 13' for the reception of a pivot pin 34 which may be used as a hinge pin for the two halves of the web. The inner edges of the plates 12' provide surfaces for cooperation with the adjustable clearance stop.

The adjustable clearance stop is similar to the combined anchor and clearance stop of Figure 1 but performs no anchoring function. The bolt 15 carries on its inner end a pair of spaced apart members 25 and 26 concentric to the bolt axis and between which the plates 12' and the web 8 fit, to be guided thereby. An eccentric cam 27 is secured to the bolt between the members 25 and 26 and cooperates with the edges of the plates 12' to adjust the clearance of the band with respect to the drum when in "off" position. The bolt 15 has bearing in the backing plate and block 16 and is provided with compression spring 20 in the same manner as previously described. The tension spring 23 holds the band in "off" position.

The adjustable anchor pin 28 at each end of the band is best shown in Figure 8. The pin has a bearing in the backing plate and a reinforcing block 29 inserted in a cut-out portion of a flange of the backing plate and welded to the backing plate. The inner end of the pin is provided with a flange 30 and an eccentric portion 31 against the latter of which a shoulder on the web of the band abuts. A nut 32 and a lock washer 33 on the center end of the pin are adapted to hold the eccentric portion 31 in adjusted position by clamping the flange 30 against the backing plate.

The central portion of the web 8 is separated from the flange 7 over on arc of approximately 100 degrees, such being slightly greater than the arc of separation shown in Figure 1, due to different pressures resulting from placing the anchor at the end of the band. The placing of the anchor at the end of the band also causes a building-up of a slight excessive pressure near the anchor taking the torque of the brake. This excessive pressure can be decreased somewhat by increasing the flexibility of the band at this point and we, therefore, have shown the web decreased in depth over these portions although the same result could be secured by separating the web from the flange.

The action of the brake band in both forms of brake disclosed, is the same in either direction of rotation of the drum as the band is constructed the same on each side of its center. By the use of my novel brake band we are able to secure the ease of operation of a two-shoe brake and at the same time preserve the advantages of a band brake as to area of braking surface.

Being aware of the possibility of modification in the particular structures herein described without departing from the fundamental principles of our invention, we do not intend that its scope be limited except as set forth by the appended claims.

Having fully described our invention, what we claim as new and desire to secure by Letters Patent of the United States is:

1. In braking apparatus, the combination of a drum and a flexible brake band adapted to have its ends expanded into engagement with the drum, said band comprising a lining carrying portion and a reinforcing web, the web being divided into two parts at a point intermediate its ends and each of the adjacent ends of the web parts being free of the lining carrying portion over a substantial arc thereof.

2. In braking apparatus, the combination of a drum and a flexible brake band adapted to have its ends expanded into engagement with the drum, said band comprising a lining carrying portion and a reinforcing web, said web comprising two portions in end to end relation, the adjacent ends being located intermediate the ends of the band and the flexibility of the band being increased over a substantial arc thereof and on each side of the adjacent ends of the web.

3. In braking apparatus, the combination of a drum and a flexible brake band adapted to have its ends expanded into engagement with the drum, said band comprising a lining carrying portion and a reinforcing web, said web being divided into two parts at a point intermediate its ends, and means for pivoting the adjacent ends of the two parts of said web together.

4. In braking apparatus, the combination of a drum and a flexible brake band adapted to have its ends expanded into engagement with the drum, said band comprising a flange and a reinforcing web, said web being divided into two parts at a point intermediate its ends and free of the flange adjacent the point of division, and means for pivoting the two parts of said web together.

5. In braking apparatus, the combination of a drum, a flexible brake band adapted to have its ends expanded into engagement with the drum, said band comprising a flange and a reinforcing web, said web being divided into two parts at a point intermediate its ends, means for pivoting the adjacent ends of the two parts of said web together, and an anchor at each end of said band.

6. In braking apparatus, the combination of a drum, a flexible brake band adapted to have its ends expanded into engagement with the drum, said band comprising a flange and a reinforcing web, said web being divided into two parts at a point intermediate its ends and separated from the flange adjacent the point of division, and an anchor for said band between the two parts of said web.

7. In braking apparatus, the combination of a drum, a flexible brake band adapted to have its ends expanded into engagement with the drum, said band comprising a flange and a reinforcing web, said web being divided into two parts at a point intermediate its ends and separated from the flange adjacent the point of division, and an adjustable anchor for each end of said band.

8. In braking apparatus, the combination of a drum, a flexible brake band adapted to be expanded into engagement with the drum, said band comprising a flange and a reinforcing web, said web being divided into two parts at a point intermediate its ends and separated from the flange adjacent the point of division, means for pivoting the two parts of said web together, and an anchor for one end of said band.

9. In braking apparatus, the combination of a drum, a flexible brake band adapted to be expanded into engagement with the drum, said band comprising a flange and a reinforcing web, said web being divided into two parts at a point intermediate its ends and separated from the flange adjacent the point of division, and an anchor for each end of the band, said band having its flexibility increased adjacent the anchors.

10. In braking apparatus, the combination of a drum, a flexible brake band comprising a flange and a reinforcing web, said web being divided into two parts at a point intermediate its ends, a plate secured to each part of the web, and an anchor pin for said band passing through each plate and lying between the two parts of said web.

11. In braking apparatus, the combination of a drum, a flexible brake band comprising a flange and a reinforcing web, said web being divided into two parts at a point intermediate its ends, a plate secured to each part of the web, and means for pivoting the two plates together.

12. In braking apparatus, the combination of a drum, a brake band comprising a lining carrying portion and a reinforcing web, said web being provided with a recess intermediate its ends, a combined anchor and adjustable clearance stop for said band comprising a rotatable anchor pin extending into said recess, and means on said anchor pin cooperating with said band to adjust the clearance of said band with respect to said drum by the rotation of said anchor pin.

13. In braking apparatus, the combination of a drum, a brake band comprising a lining carrying portion and a reinforcing web, said web being provided with a recess intermediate its ends, a combined anchor and adjustable clearance stop for said band comprising a rotatable anchor pin extending into said recess, and cam means secured to the pin and eccentric to the axis thereof for cooperation with said band.

14. In braking apparatus, the combination of a drum, a brake band comprising a lining carrying portion and a reinforcing web, said web being provided with a recess intermediate its ends, a combined anchor and adjustable clearance stop for said band comprising a rotatable anchor pin extending into said recess, and cam means secured to said pin on each side of the web and eccentric to the axis thereof for cooperation with said band.

15. In braking apparatus, the combination of a backing plate provided with a depression therein forming a flange, said flange being provided with a cut-out portion and a reinforcing block having one end inserted in said cut-out portion and secured to the backing plate, said reinforcing block and backing plate being provided with aligned bearings to receive a rotatable pin.

16. In braking apparatus, the combination with a backing plate and a brake shoe, of a combined adjustable stop and guide for the shoe comprising a shaft rotatably mounted in the backing plate and provided with a head exterior thereof, a cam carried by the inner end of the shaft eccentric to the axis thereof and adapted to engage the shoe, guide means carried by said shaft and cooperating with the sides of the shoe, and a spring between the shaft head and the backing plate for maintaining frictional contact between the backing plate and an element carried by the shaft.

BURNS DICK.
STEVE SCHNELL.